(12) United States Patent
Tagare

(10) Patent No.: US 7,504,810 B1
(45) Date of Patent: Mar. 17, 2009

(54) APPARATUS AND METHOD FOR GENERATING A SPREAD-SPECTRUM CLOCK FOR A SWITCHING REGULATOR

(75) Inventor: Madhavi Tagare, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 407 days.

(21) Appl. No.: 11/060,981

(22) Filed: Feb. 18, 2005

(51) Int. Cl.
*H02M 1/00* (2007.01)
(52) U.S. Cl. ...................................... 323/282
(58) Field of Classification Search ................ 323/282, 323/283, 284, 285, 351
See application file for complete search history.

(56) References Cited

U.S. PATENT DOCUMENTS

| | | | |
|---|---|---|---|
| 5,488,627 A | | 1/1996 | Hardin et al. |
| 5,631,920 A | | 5/1997 | Hardin |
| 6,326,859 B1 | * | 12/2001 | Goldman et al. ............. 331/143 |
| 6,366,070 B1 | * | 4/2002 | Cooke et al. ................. 323/284 |
| 7,135,937 B2 | * | 11/2006 | Mitsuda ....................... 331/143 |
| 2005/0243894 A1 | * | 11/2005 | Chen et al. ................... 375/139 |

FOREIGN PATENT DOCUMENTS

EP        881765 A1  *  12/1998

OTHER PUBLICATIONS

D.A. Stone et al., "Effect of Spread-Spectrum Modulation of Switched Mode Power Converter PWM Carriewr Frequencies on Conducted EMI", Electronics Letters, May 11, 1995, vol. 31, No. 10, pp. 769-770.

M. Kuisma, "Variable Frequency Switching in Power Supply EMI-Control: an Overview", IEEE AES Systems Magazine, Dec. 2003, pp. 19-22.

Hiroshi Sadamura et al., "Spread-Spectrum Clocking in Switching Regulators to Reduce EMI", IEEE, Asia-Pacific Conference, Aug. 6-8, 2002 pp. 141-144.

* cited by examiner

*Primary Examiner*—Adolf Berhane
(74) *Attorney, Agent, or Firm*—Darby & Darby P.C.; Matthew M. Gaffney

(57) ABSTRACT

A switching regulator circuit is provided. The switching regulator circuit includes an oscillator circuit which includes a capacitor, a switch, a comparator, a variable resistor, and a modulating signal generation circuit. The capacitor is arranged to receive a first current to provide a ramp voltage. Also, the variable resistor is arranged to receive a second current to provide a reference voltage. The resistance of the variable resistor is modulated based on a modulating signal. The comparator is arranged to compare the ramp voltage with a reference voltage to provide a clock signal. Further, the switch is arranged to discharge the capacitor when the clock signal is asserted. The modulating signal generation circuit is arranged to provide the modulating waveform as a sawtooth signal, or other type of modulating waveform suitable for spread-spectrum modulation. Accordingly, the clock signal is a spread-spectrum clock signal.

20 Claims, 6 Drawing Sheets

APPARATUS AND METHOD FOR GENERATING A SPREAD-SPECTRUM CLOCK FOR A SWITCHING REGULATOR

FIELD OF THE INVENTION

The invention is related to switching regulators, and in particular, to an apparatus and method for an oscillator that includes a variable resistance that is modulated to provide a spread-spectrum clock signal.

BACKGROUND OF THE INVENTION

Spread-spectrum is a useful technique for many applications, including spread-spectrum telecommunications and spread-spectrum clock generation in synchronous digital systems containing microprocessors.

Spread-spectrum telecommunication, accomplished by employing frequency hopping and the like, may be employed to reduce interference and noise, and to improve privacy in confidential communications.

Spread-spectrum clock generation may be employed to reduce electro-magnetic interference (EMI). A fixed-frequency clock may have a narrow frequency spectrum with a high peak frequency spectral density. However, with spread-spectrum clock generation, the clock signal frequency spectrum is spread so that the total energy of the clock signal is distributed over a wider frequency range, reducing the energy at the peak carrier frequency. This in turn may reduce EMI.

BRIEF DESCRIPTION OF THE DRAWINGS

Non-limiting and non-exhaustive embodiments of the present invention are described with reference to the following drawings, in which.

DETAILED DESCRIPTION

Figure 1:
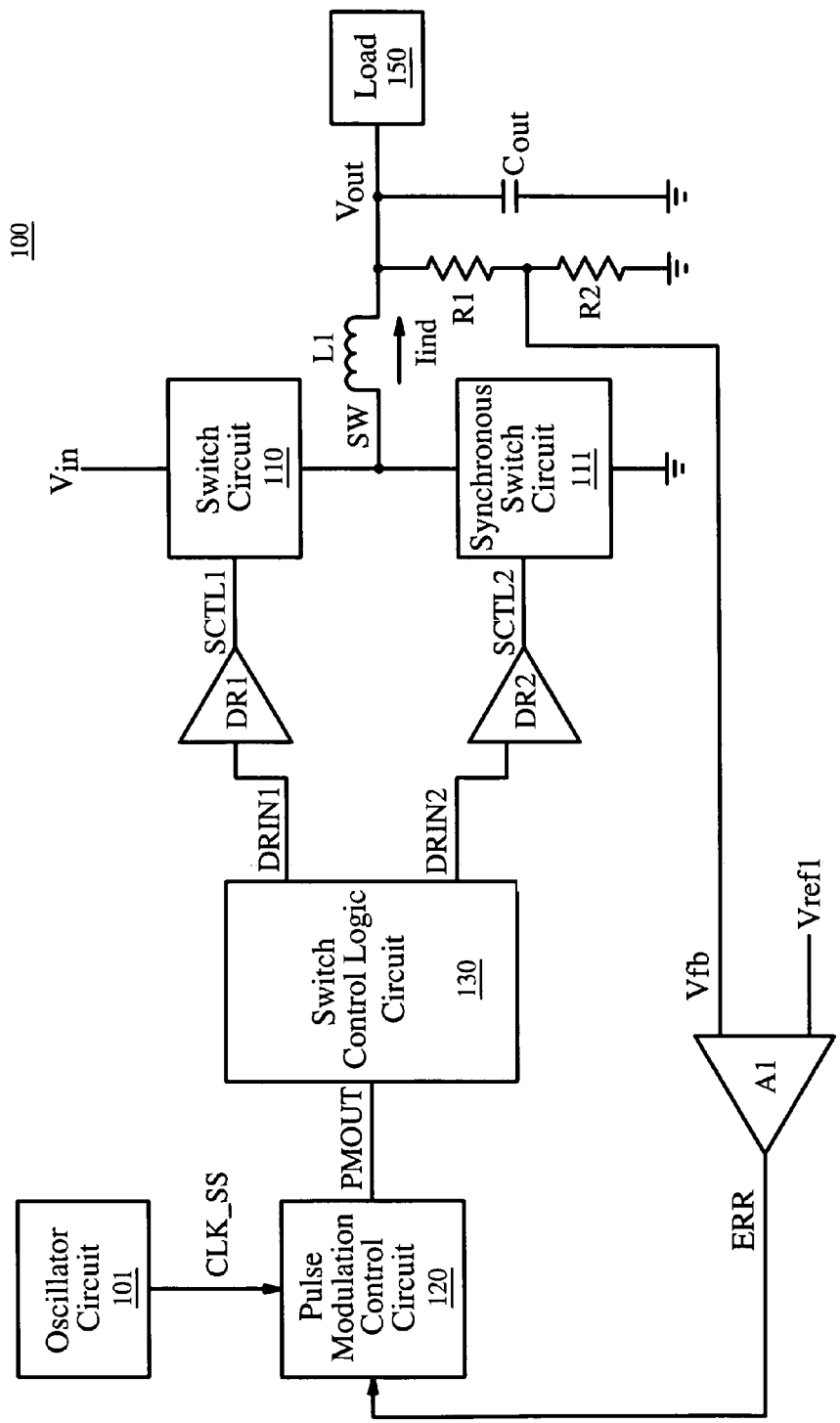
FIG. 1 illustrates a block diagram of an embodiment of a switching regulator.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to an apparatus and method for generating a spread-spectrum clock for a switching regulator circuit. The switching regulator circuit includes an oscillator circuit which includes a capacitor, a switch, a comparator, a variable resistor, and a modulating signal generation circuit. The capacitor is arranged to receive a first current to provide a ramp voltage. Also, the variable resistor is arranged to receive a second current to provide a reference voltage. The resistance of the variable resistor is modulated based on a modulating signal. The comparator is arranged to compare the ramp voltage with a reference voltage to provide a clock signal. Further, the switch is arranged to discharge the capacitor when the clock signal is asserted. The modulating signal generation circuit is arranged to provide the modulating waveform as a sawtooth signal, or other type of modulating waveform suitable for spread-spectrum modulation. The reference voltage is modulated due to the modulation of the variable resistor. Accordingly, the clock signal is a spread-spectrum clock signal.

FIG. 1 illustrates a block diagram of an embodiment of switching regulator circuit 100. Switching regulator circuit 100 may include switch circuit 110, synchronous switch circuit 111, inductor L1, pulse modulation control circuit 120, switch control logic circuit 130, output capacitor Cout, load 150, error amplifier A1, and resistors R1 and R2. Additionally, although not shown in FIG. 2, other elements such as a capacitor resistor network may be included between error signal ERR and feedback signal Vfb to control the frequency response of switching regulator circuit 100.

In one embodiment, switching regulator circuit 100 is arranged to provide regulated output voltage Vout from input voltage Vin. Switch circuit 110 is arranged to open and close based on switch control signal SCTL1. Similarly, in a synchronously-rectified embodiment, synchronous switch circuit 111 is arranged to open and close based on synchronous switch control signal SCTL2. Inductor L1 may be arranged to provide inductor current Iind to output capacitor Cout such that output voltage Vout is provided.

Further, oscillator circuit 101 is arranged to provide signal CLK_SS such that signal CLK_SS is a spread-spectrum clock signal. Accordingly, EMI may be reduced.

In one embodiment, resistors R1 and R2 are arranged as a voltage divider to provide feedback signal Vfb from output voltage Vout. Also, error amplifier A1 is arranged to provide error signal ERR from signals Vfb and Vref. In one embodiment, error amplifier A1 is arranged to provide signal ERR as a voltage, $V_{ERR}$. In another embodiment, error amplifier A1 is an operational transconductance amplifier (OTA) that is arranged to provide error signal ERR as a current, $I_{ERR}$.

Pulse modulation circuit 120 is arranged to modulate signal CLK_SS based on signal ERR, and to provide pulse modulation output signal PMOUT based on the pulse modulation. In one embodiment, pulse modulation control circuit 120 includes a pulse width modulation (PWM) circuit that is arranged to modulate the duty cycle of signal CLK_SS. In another embodiment, pulse modulation control circuit 120 includes a pulse frequency modulation (PFM) circuit that is arranged to modulate the frequency of signal CLK_SS.

Although oscillator circuit 101 and pulse modulation circuit 120 are shown as separate circuits in FIG. 1, some of the functionality of oscillator circuit 101 and pulse modulation circuit 120 may be combined. For example, in one embodiment, pulse modulation control may be accomplished by components in oscillator circuit 101 that perform pulse modulation based on error signal ERR, rather than accomplishing the pulse modulation in a separate circuit.

Switch control logic circuit 130 is arranged to provide signal DRIN1 from signal PMOUT. Also, in a synchronously-rectified embodiment, switch control logic circuit 130 is further arranged to provide signal DRIN2 from signal PMOUT. Driver circuit DR1 is arranged to provide switch control signal SCTL1 from signal DRIN1. In a synchronously-rectified embodiment, switching regulator 100 includes driver circuit DR2, which is arranged to provide switch control signal SCTL2 from signal DRIN2. In an asynchronously-rectified embodiment, switching regulator circuit 100 does not include driver circuit DR2 or synchronous switch circuit 111.

Although FIG. 1 illustrates an arrangement of switching regulator circuit 100 in which switching regulator circuit 100 is a synchronous buck voltage regulator, in other embodiments, switching regulator circuit 100 may be arranged as an asynchronously-rectified regulator, a current regulator, flyback regulator, a boost regulator, or the like. Also, switching regulator circuit 100 may employ switched capacitors rather than inductor L1. These variations and other variations may be employed for switching regulator circuit 100 without departing from the scope and spirit of the invention.

Figure 2A:
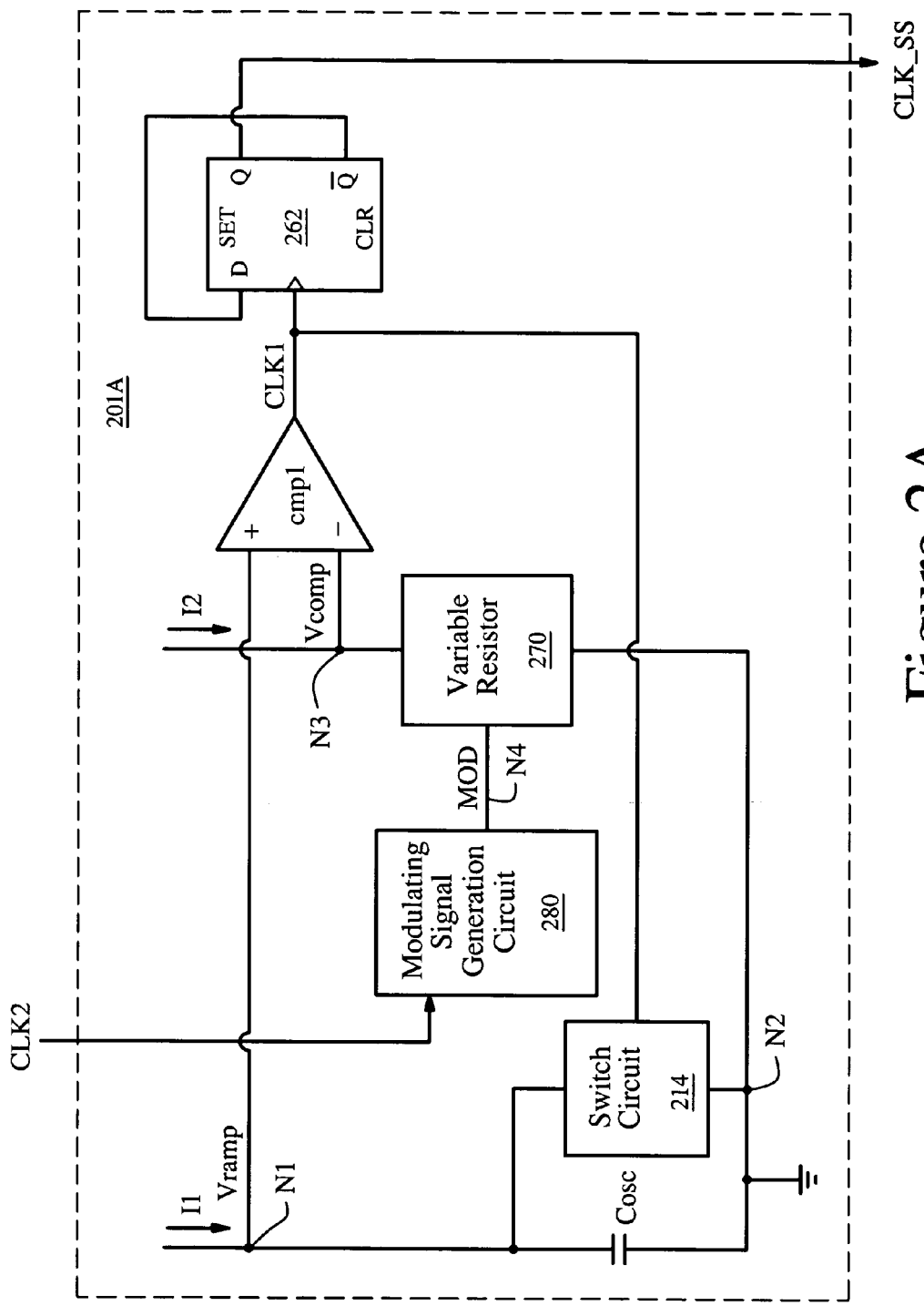
FIG. 2A shows a block diagram of an embodiment of the oscillator circuit of FIG. 1.

FIG. 2A shows a block diagram of an embodiment of oscillator circuit 201A. Oscillator circuit 201A may be employed as an embodiment of oscillator circuit 101 of FIG. 1. Also, oscillator circuit 201A may be employed for other applications. Oscillator circuit 201A may include modulating signal generation circuit 280, comparator circuit cmp1, switch circuit 214, variable resistor 270, flip-flop 262, and capacitor circuit Cosc.

In operation, capacitor circuit Cosc provides ramp voltage Vramp at node N1 based, in part, on current I1. Comparator circuit cmp1 is configured to compare ramp voltage Vramp with comparison voltage Vcomp, and to provide signal CLK1 based on the comparison. Also, switch circuit 214 is arranged to close if signal CLK1 is asserted, and further arranged to open if signal CLK1 is unasserted. Accordingly, switch circuit 214 is arranged to discharge capacitor circuit Cosc if signal CLK1 is asserted. In one embodiment, flip-flop 262 is arranged to provide signal CLK_SS from signal CLK1. In another embodiment, flip-flop 262 is not included in oscillator circuit 201.

Currents I1 and I2 may each be provided by a reference current source, or the like. In one embodiment, although not shown in FIG. 2, a current source circuit is coupled to node N1, and another current source circuit is coupled to node N3 (as shown in FIG. 5 in one embodiment).

Variable resistor 270 is arranged to have a resistance, Rvariable, that varies based on modulation signal MOD. In one embodiment, the resistance is proportional to signal MOD. In one embodiment, the period of signal CLK_SS may be substantially given by T=Cosc*I2*Rvariable/I1.

Modulating signal generation circuit 280 is arranged to provide signal MOD, and is further arranged to be clocked by signal CLK2. In oscillator circuit 201A, signal CLK2 is an external clock signal. In one embodiment, modulating signal MOD is a multi-bit digital signal having a digital value that changes over time according to a modulating waveform, where the modulating waveform is suitable for spread-spectrum modulation. For example, the modulating waveform may be a sawtooth wave, a triangle wave, a sinusoidal wave, a linear combination of a triangle wave and its cubic, or other waveform suitable for spread-spectrum modulation. Also, random or pseudo-random modulation may be employed for the modulating waveform.

Figure 5:
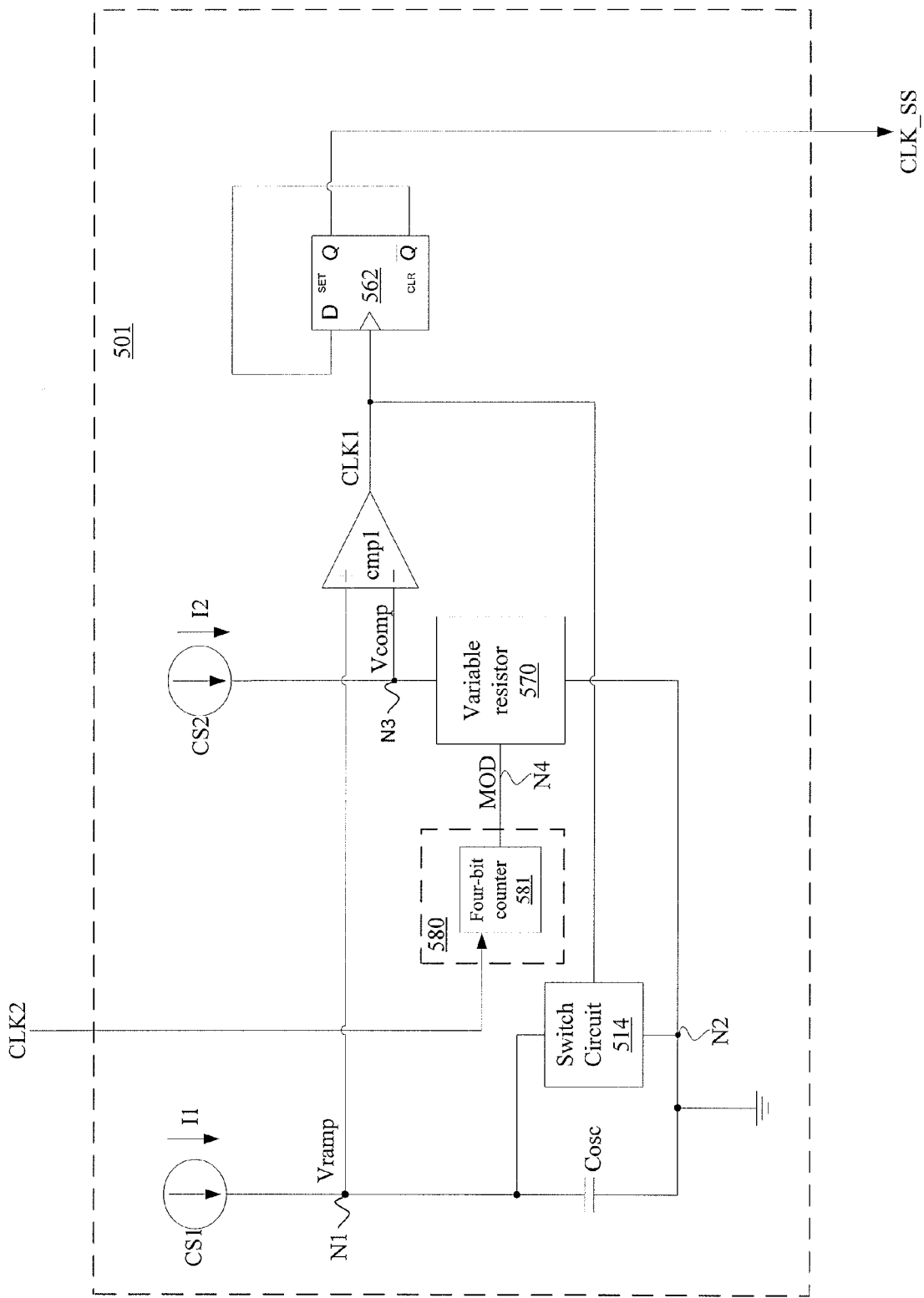
FIG. 5 illustrates a block diagram of an embodiment of the oscillator circuit of FIG. 2A, in accordance with aspects of the present invention.

In one embodiment, modulating signal generation circuit 280 is a four-bit counter (as shown in FIG. 5 in one embodiment) that provides signal MOD by counting from 1111 down to 0000, then returning to 1111 to repeat the process. In this embodiment, signal MOD is provided according to a sawtooth waveform. In one embodiment, the center frequency of signal CLK_SS may be shifted by changing the start and stop values of the counter. Also, in one embodiment, the counter may be starting at a different value each time, thus going through a different sequence of frequencies during each modulation cycle.

Figure 2B:
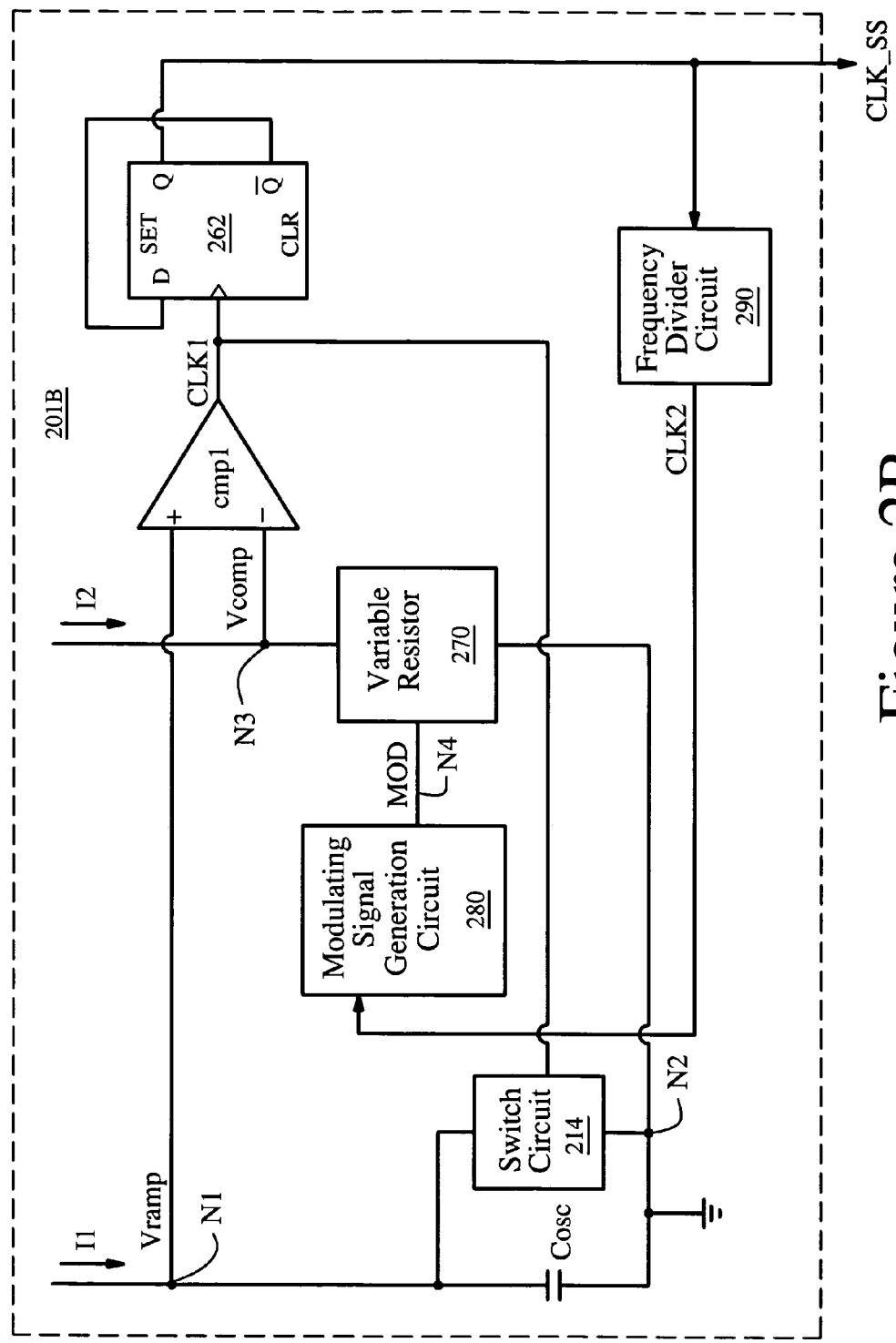
FIG. 2B illustrates a block diagram of an embodiment of the oscillator circuit of FIG. 1 that does not receive any external clock signals.

FIG. 2B illustrates a block diagram of an embodiment of oscillator circuit 201B. Oscillator circuit 201B is arranged to operate in a similar manner to oscillator circuit 201A of FIG. 1, albeit different in some ways. Oscillator circuit 201B further includes frequency divider circuit 290. Also, oscillator circuit 201B does not receive any external clock signals. In oscillator circuit 201B, signal CLK2 is not an external clock signal. Rather, frequency divider circuit 290 is arranged to provide signal CLK2 by performing a frequency division on signal CLK_SS. The modulation frequency may be changed by changing the divider ratio of frequency divider circuit 290.

Figure 3:
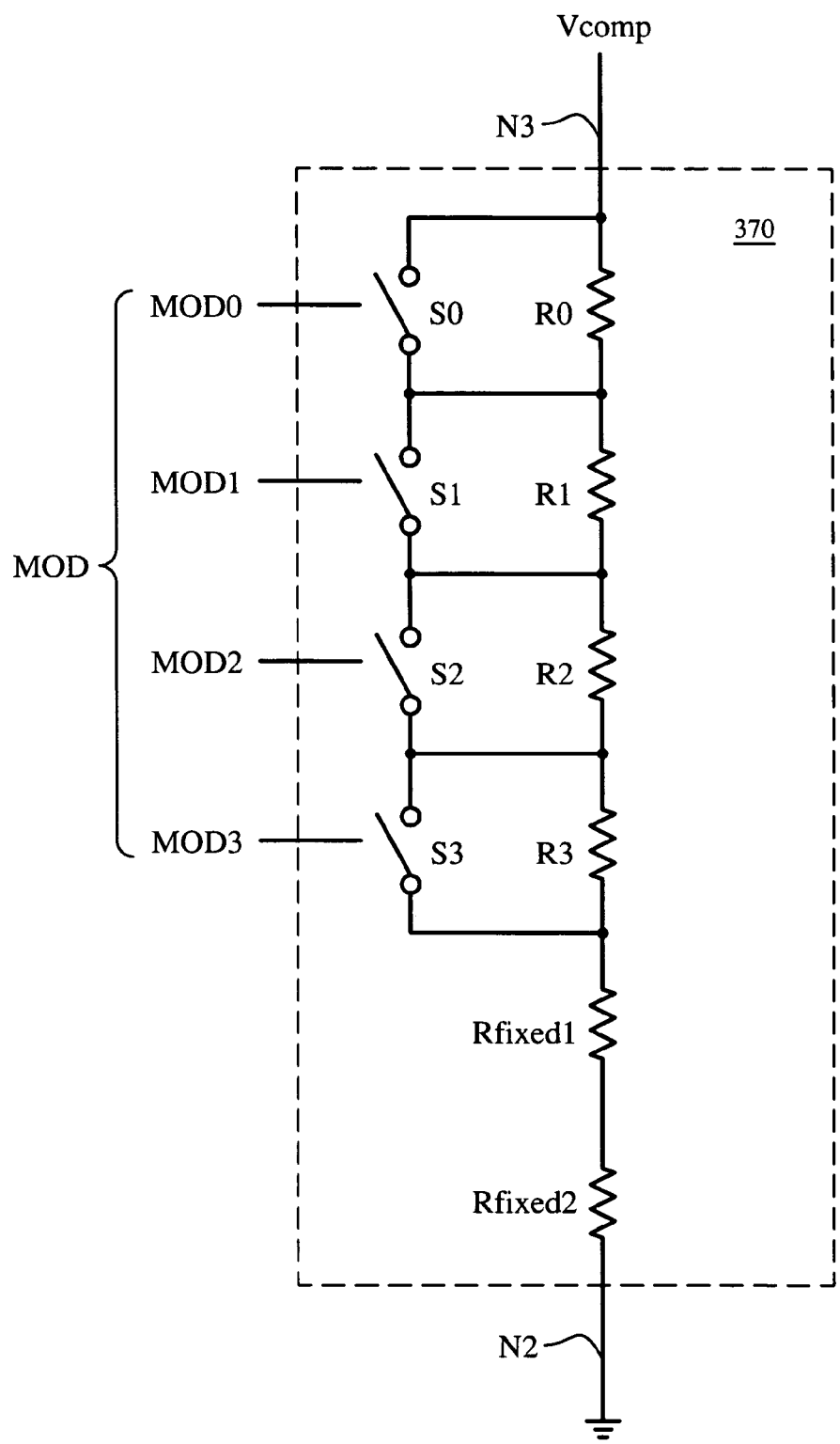
FIG. 3 schematically illustrates a block diagram of an embodiment of the variable resistor of FIG. 2A and FIG. 2B.

FIG. 3 schematically illustrates a block diagram of an embodiment of variable resistor 370, which may be employed as an embodiment of variable resistor 270 of FIG. 2A or FIG. 2B. Variable resistor 370 includes resistors R0-R3 and Rfixed1-Rfixed2, and switches S0-S3.

In operation, switches S0-S3 open and close responsive to bits MOD0-MOD3 of signal MOD, respectively.

Variable resistor 370 is arranged to provide a total equivalent resistance Rvariable between nodes N2 and N3 that varies based on signal MOD. In one embodiment, resistors R0-R3 are binary weighed resistors. For example, in one embodiment, R1=2*R0, R2=4*R0, and R3=8*R0. The frequency spread can be controlled by choosing the appropriate value of R0-R3.

Although one embodiment of a variable resistor is illustrated in FIG. 3, other embodiments of variable resistor 270, which may implement a variable resistance in a different manner, are within the scope and spirit of the invention. For example, in other embodiments, variable resistor 270 may include any of a variety of different arrangements of a plurality of resistors and switches, arranged such that each of the switches opens and closes responsive to a bit of digital signal MOD, and further arranged in such a way that the resistance of variable resistor 270 varies based on signal MOD.

Figure 4:
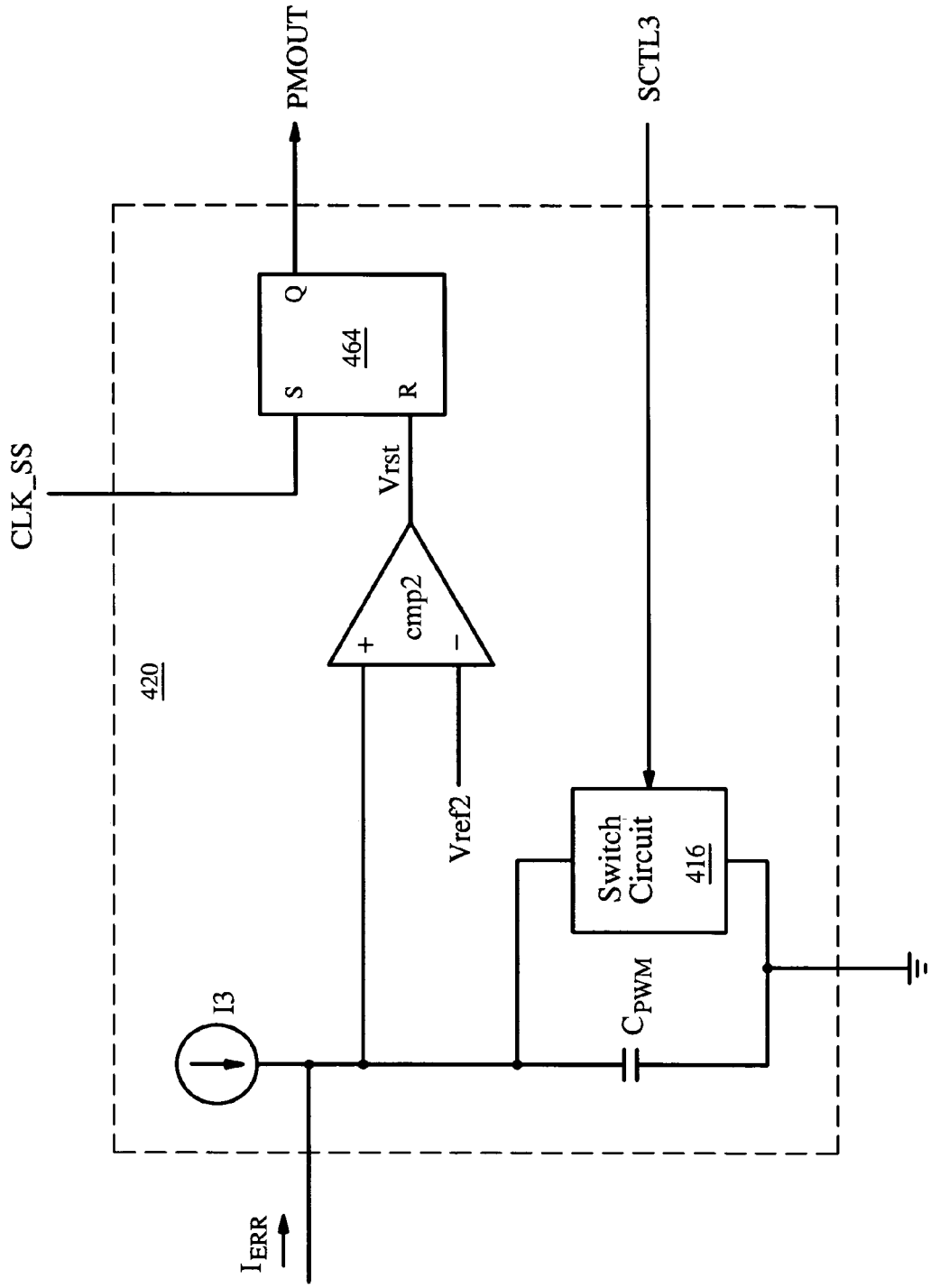
FIG. 4 shows a block diagram of an embodiment of the pulse width modulation control circuit of FIG. 1.

FIG. 4 shows a block diagram of an embodiment of pulse width modulation (PWM) control circuit 420, which is an embodiment of pulse modulation control circuit 120 of FIG. 1. PWM control circuit 420 includes capacitor $C_{PWM}$, current source I3, comparator cmp2, and SR latch 464.

Error current $I_{ERR}$ is an embodiment of error signal ERR of FIG. 1. Although not shown in FIG. 1, in one embodiment, signal SCTL3 may be provided by switch control logic circuit 130 of FIG. 1.

Although one embodiment of a PWM control circuit is illustrated in FIG. 4, other embodiments of pulse modulation circuit 120 are within the scope and spirit of the invention.

FIG. 5 illustrates a block diagram of an embodiment 501 of the oscillator circuit 201A of FIG. 2A. Oscillator circuit embodiment 501 further includes current source circuit CS1 and current source circuit CS2. Current source circuit CS1 is coupled to node N1, and current source circuit CS2 is coupled to node N3. Current source circuit CS1 provides current I1, and current source circuit CS2 provides current I2. In the embodiment shown, modulating signal generation circuit 580 includes four-bit counter 581.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A switching regulator circuit, comprising:
   a spread-spectrum oscillator circuit, including:
      a capacitor circuit that is arranged to receive a first current, and to provide a ramp voltage from the first current;
      a variable resistor that is arranged to provide a comparison voltage based on a second current, and further based on a modulating signal;
      a comparator circuit that is arranged to compare the ramp voltage with the comparison voltage, and to provide a first clock signal based on the comparison; and
      a switch circuit that is arranged to discharge the capacitor circuit if the first clock signal corresponds to an asserted level.

2. The switching regulator circuit of claim 1, wherein the oscillator circuit further includes a flip-flop that is arranged to provide another clock signal from the first clock signal.

3. The circuit of claim 1, further comprising:
   an error amplifier circuit that is arranged to provide an error signal based, in part, on an output signal and a reference signal; and
   a driver circuit that is arranged to drive another switch circuit based on a driver input signal, wherein the drive input signal is based on the error signal, and further based on another clock signal; and wherein the output signal is provided based, in part, on the driving of said another switch circuit.

4. The switching regulator circuit of claim 1, wherein the variable resistor includes a plurality of resistors and a plurality of switches that are arranged such that a total equivalent resistance of the variable resistor is substantially proportional to the modulating signal.

5. A switching regulator circuit, comprising:
   a spread-spectrum oscillator circuit, including:
      a capacitor circuit that is arranged to receive a first current, and to provide a ramp voltage from the first current;
      a variable resistor that is arranged to provide a comparison voltage based on a second current, and further based on a modulating signal;
      a comparator circuit that is arranged to compare the ramp voltage with the comparison voltage, and to provide a first clock signal based on the comparison; and
      a switch circuit that is arranged to discharge the capacitor circuit if the first clock signal corresponds to an asserted level, wherein the variable resistor includes a plurality of resistors and a plurality of switches that are arranged such that a total equivalent resistance of the variable resistor is substantially proportional to the modulating signal, the modulating signal is a multi-bit digital signal, the plurality of resistors includes binary weighted resistors coupled in series, a separate switch of the plurality of switches is arranged in parallel with each of the binary weighted resistors, and wherein each switch in the plurality of switches is configured to open and close responsive to a separate bit of the modulating signal.

6. The switching regulator circuit of claim 1, wherein the oscillator circuit further includes a modulating signal generation circuit that is arranged to provide the modulating signal such that the modulating signal is a multi-bit digital signal having a digital value that changes over time according to a modulating waveform, and such that the modulating waveform is suitable for spread-spectrum modulation; and wherein the modulating signal generation circuit is arranged to receive a second clock signal.

7. The switching regulator circuit of claim 6, wherein the oscillator circuit further includes a frequency divider circuit that is arranged to provide the second clock signal based, in part, on the first clock signal, wherein the oscillator circuit does not receive any external clock signals.

8. The switching regulator circuit of claim 6, wherein the modulating waveform is a sawtooth waveform.

9. The switching regulator circuit of claim 8, wherein the modulating signal generation circuit is a four-bit counter.

10. A switching regulator circuit, comprising:
    an oscillator circuit, including:
       a first current source circuit that is coupled to a first node;
       a capacitor circuit that is coupled between the first node and a second node;
       a switch circuit that is coupled between the first node and the second node;
       a second current source circuit that is coupled to a third node;
       a modulating signal generation circuit that is coupled to a fourth node;
       a variable resistor that is coupled between the third node and the second node, and further coupled to the fourth node; and
       a comparator circuit including an input that is coupled to the first node, and another input that is coupled to the third node.

11. The switching regulator of claim 10, further comprising:
    an error amplifier; and
    a pulse width modulation control circuit that is coupled to the error amplifier and the oscillator circuit.

12. The switching regulator circuit of claim 10, wherein the modulating signal generation circuit is arranged to provide a modulating signal at the fourth node such that the modulating signal is a multi-bit digital signal having a digital value that changes over time according to a modulating waveform, and such that the modulating waveform is suitable for spread-spectrum modulation; the modulating signal generation circuit is arranged to receive a second clock signal;

the variable resistor includes a plurality of resistors and a plurality of switches that are arranged such that a total equivalent resistance of the variable resistor is substantially proportional to the modulating signal;

the plurality of resistors includes binary weighted resistors;

a separate switch of the plurality of switches is arranged in parallel with each of the binary weighted resistors; and wherein each switch in the plurality of switches is configured to open and close responsive to a separate bit of the modulating signal.

13. The switching regulator circuit of claim 12, wherein the modulating signal generation circuit is arranged to provide the modulating signal such that the modulating waveform includes at least one of a sawtooth waveform, a triangle waveform, a sinusoidal waveform, and a linear combination of a triangle waveform and its cubic.

14. The switching regulator circuit of claim 12, wherein the oscillator circuit further includes a frequency divider circuit that is arranged to provide the second clock signal based, in part, on the first clock signal, and wherein the oscillator circuit does not receive any external clock signals.

15. A method for switching regulation, comprising:

generating a voltage ramp signal, including:
  providing a first current to a capacitor circuit to generate the voltage ramp signal; and
  employing a switch to discharge the capacitor circuit if a comparator output signal is asserted;

generating a comparison voltage, including:
  providing a second current to a variable resistor to generate the comparison voltage; and
  providing a modulating signal to the variable resistor to modulate the resistance of the variable resistor, such that the modulating signal is suitable for spread-spectrum modulation; and comparing the voltage ramp signal with the comparison voltage to provide the comparator output signal.

16. The method of claim 15, wherein providing the second current to the variable resistor is accomplished such that a total equivalent resistance of the variable resistor is substantially proportional to the modulating signal.

17. The method of claim 16, wherein providing the modulating signal is accomplished such that the modulating signal is a multi-bit digital signal having a digital value that changes over time according to a modulating waveform, and such that the modulating waveform is suitable for spread-spectrum modulation; and wherein generating the comparison voltage further includes controlling a plurality of switches in the variable resistor such that each switch in the plurality of switches opens and closes responsive to a separate bit of the modulating signal.

18. The method of claim 17, further including providing a clock signal by performing a frequency division of the comparator output signal, wherein providing the modulating signal is further accomplished based on the clock signal.

19. The method of claim 17, wherein the modulating waveform is a sawtooth waveform.

20. The method of claim 17, further comprising:
  providing a feedback voltage from an output voltage;
  providing an error signal based, in part, on a difference between the feedback voltage and a reference voltage;
  providing a spread-spectrum clock signal based, at least in part, on the comparator output signal;
  pulse-width modulating the spread-spectrum clock signal based on the error signal; and
  providing the output signal by performing actions, including opening and closing another switch based, in part, on the pulse-width modulated spread-spectrum clock signal.

* * * * *